Dec. 1, 1953

A. V. BEDFORD 2,661,391

MECHANICAL COLOR FILTER DEVICE FOR USE IN SEQUENTIAL TELEVISION SYSTEMS

Filed Dec. 22, 1950

2 Sheets-Sheet 1

INVENTOR

Alda V. Bedford

BY

ATTORNEY

Dec. 1, 1953

A. V. BEDFORD

MECHANICAL COLOR FILTER DEVICE FOR USE IN SEQUENTIAL TELEVISION SYSTEMS 2,661,391

Filed Dec. 22, 1950

2 Sheets-Sheet 2

INVENTOR
Alda V. Bedford
BY
ATTORNEY

Patented Dec. 1, 1953

2,661,391

UNITED STATES PATENT OFFICE 2,661,391

MECHANICAL COLOR FILTER DEVICE FOR USE IN SEQUENTIAL TELEVISION SYSTEMS

Alda V. Bedford, Princeton, N. J., assignor to Radio Corporation of America, a corporation of Delaware Application December 22, 1950, Serial No. 202,261

10 Claims. (Cl. 178—5.4)

This invention relates to the sequential type color television systems and more particularly to mechanically operated color filter devices used in combination with such systems.

The invention will be illustrated for a conventional tri-color television system using field sequential red, green and blue colored image components, but it is equally adapted to any other similar form of multi-color television system, or the like. In such systems, there are transmitted and received a series of signals representing substantially black and white image portions which sequentially carry the intelligence corresponding to color components of the original scene. At the receiver, the original multi-color picture is reproduced upon a fluorescent screen by field sequential presentation of the component color image portions. By interspersing appropriate color filters between the viewer and the screen in synchronism with the sequentially transmitted fields the reproduced composite images will appear in substantially their original colors.

Rotating disk type color filter systems have heretofore been used, as the usual color filter arrangement, but such disk filters are limited in size for use with small screen television systems. The diameter of a rotating disk must be at least twice the screen or image diameter, thus making a bulky and unsightly addition to the television receiver. A filter system, substantially the same size as the screen, which may be driven by a motor hidden within the cabinet, and one which is not limited by the tube size would be desirable in preference to a rotating disk.

There has been proposed, for the purpose of overcoming the aforementioned shortcomings, a filter arrangement employing two relatively movable filter members. Thus, one member comprises a series of color filter elements laid down in a given pattern, and the other member comprises, a corresponding mask so arranged that a slight movement of the mask with respect to the filter elements results in the transmission of light through selected filter elements and restricted within bands corresponding to the different selected component colors. This provides for a rapid succession of differently colored images without extensive mechanical motion. Such an arrangement is shown and described in the U. S. patent to George C. Sziklai, 2,457,415.

The copending application of A. V. Bedford, Ser. No. 782,104, filed October 25, 1947, which issued as U. S. Patent 2,602,854 on July 8, 1952, in addition proposes to improve the Sziklai arrangement by providing a mask and color filter with associated means causing continuous relative motion between the mask and color filter for providing low effective momentum. Complex oscillatory motion, having both translational and rotational components, is provided without the formerly required fast acceleration for such a filter at the instant of changing color fields.

The present invention involving a system having a different mode of operation, relates to improvements in both the above-mentioned types of color filters. In this system also, the color filter elements and a portion of the mask move relative to each other in a complex oscillatory type of motion without fast acceleration at the instant of changing color fields. The relative motion between the members, however, involves only a translational component of motion. Thus, in accordance with the invention a sequential color change is afforded which may readily be adjusted to follow an associated scanning operation.

One object of this invention is to provide an improved, mechanically operated color filter system for use in color television systems.

Another object of this invention is to provide a mechanical color filter system operable in synchronism with an associated scanning process without requiring high-inertia motion, and capable of high speed operation, thus providing improved performance of sequential color television systems.

Further objects and advantages of the invention will be made clear to those skilled in the art from the following detailed description of the invention when considered in connection with the accompanying drawing, in which.

Figures 1, 2:
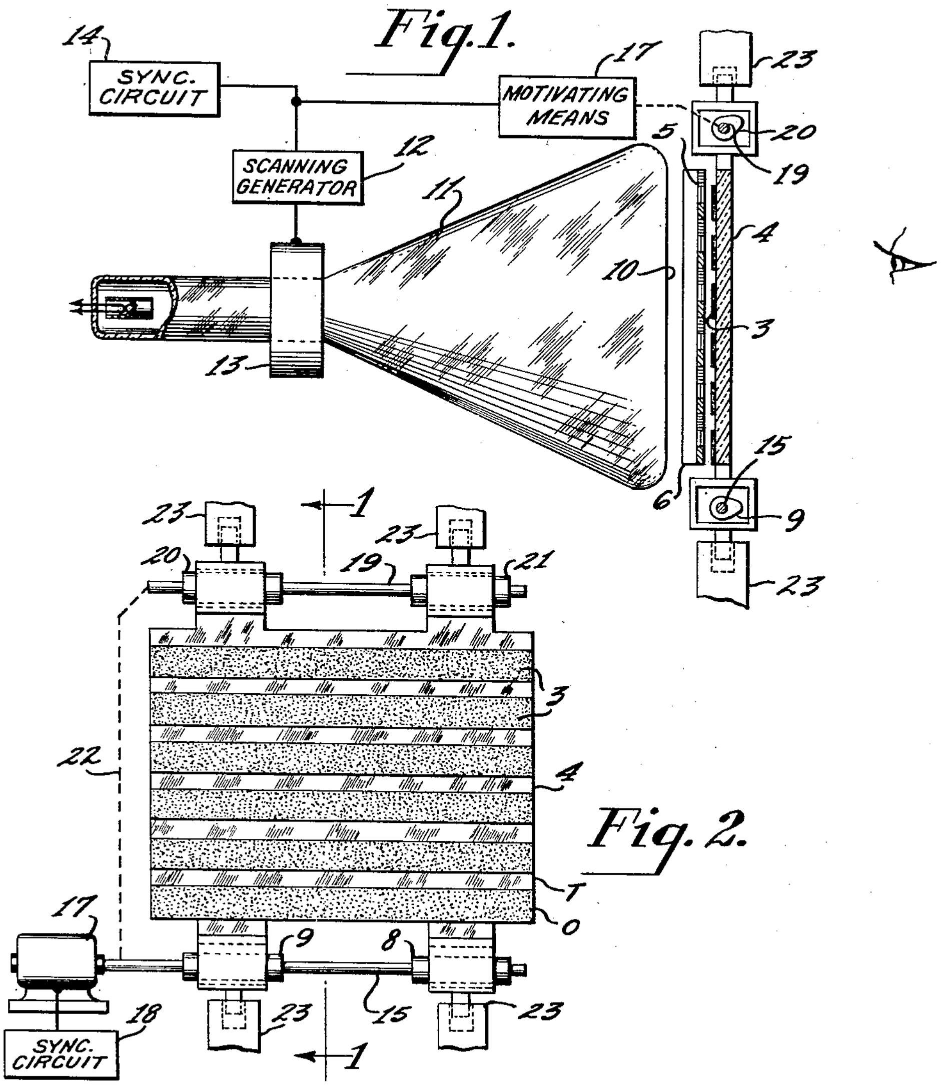
Figure 1 is a side view, partially in section, of an embodiment of the invention, as associated with a cathode ray tube.
Figure 2 is a plan view of a color filter mask constructed in accordance with the invention, together with its associated mechanical driving mechanism for supplying relative motion of the mask with respect to an associated color filter.

Referring in particular to Figure 1, there is shown an electron beam scanning tube or kinescope 11. Tube 11 may alternatively be a transmitting tube such as the image orthicon, but it is to be recognized that any suitable image reproducing or scanning means either at a receiver or transmitter may be used, and the present embodiment is for purposes of illustration rather than limitation.

Both a movable mask 3 and an associated fixed color filter 5 is mounted near the face of the kinescope 11. To give wide angle color viewing the mask 3 and color filter 5 should be mounted as close to each other as possible. They may, for example, be touching each other or may be separated by a thin film of lubricant. As a practical embodiment, the mask 3 and the color filter 5 may both be mounted photographically as gelatin film facings upon corresponding transparent carrier surfaces 4 and 6.

In the form of the invention shown, elements of the mask 3 are made relatively movable with respect to the fixed color filter 5. Obviously the mask 3 may be fixed and the filter elements 5 may be made relatively movable, if desired. Both the mask 3 and the color filter 5 may be movable, also, but in any case the relative motion between the mask 3 and filter would be identical for any given type of operation, and the illustrated form is preferred because of its simplicity. For purposes of clarity, the operation of this invention will be explained only in connection with the embodiment illustrated in Figure 1, wherein the filter 5 is fixed and the mask 3 is movable.

Figure 3:
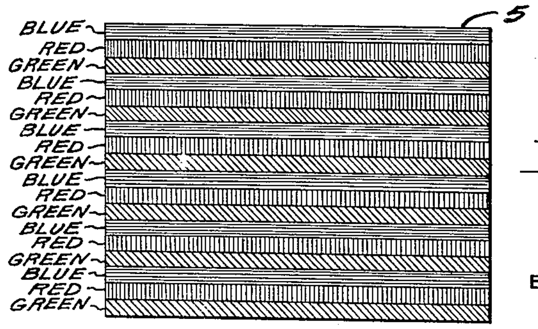
Figure 3 is a plan view of a ruled color filter constructed in accordance with the invention; and, Figure 4 is a graph illustrating operation of the invention throughout an entire cycle corresponding to a total frame scanning period of three color fields in a field sequential color television system.

Color filter 5, as shown in Figure 3, consists of a plurality of narrow strips of different selected component color filter elements arranged sequentially in recurring color groups to provide a fixed pattern of blue, red and green strips. Although in practice the color filter elements are small enough to resolve into a complete image and be indistinguishable by the unaided human eye at the optimum picture viewing distance of a few feet, for the purpose of illustration they have been shown somewhat enlarged.

The mask 3, as more clearly shown in Figure 2, consists of a grating having transparent sections T which substantially correspond in size, shape and spacing with any one selected component color element of the filter 5. The configuration of these elements is not restricted to lines, but may have other shapes, such as the dot structure shown in British Patent 589,345. However, lines are easy to construct and are entirely adequate for operation under most conditions. Operation of the invention will be made more clear, therefore, in confining the description to masks and filters comprising a series of parallel line sections. Opaque sections O which are substantially of twice the width of a single color section are alternately interspersed with the transparent sections of the mask 3.

Images are reproduced upon the fluorescent screen 10 of the cathode ray tube 11 by progressive scanning of an electron beam in accordance with a scanning waveform supplied by the scanning generator 12 to the deflection yoke 13. A synchronization pulse generator 14 is coupled to the scanning generator 12 as well as a motivating means 17 for the mechanical color filter of this invention. Thus, the presentation of different color elements in front of the fluorescent screen 10 may be synchronized with the image scanning to provide images in substantially their natural color. This is accomplished by means for stretching the mask 3 in an irregular oscillatory motion to expose different elements of the color filter 5 with respect to the transparent mask sections T of the mask 3 such that in each cycle of the motion each component color is traversed in field sequential fashion along the entire length of the filter 5.

The color filter 5 is mounted in a fixed position in front of the screen 10, and the mask 3 is connected with a mechanism for stretching it in accordance with a predetermined pattern. Thus, the mask 3 is mounted upon a base plate 4 of plastic, silicone rubber, glass or other flexible transparent body having a modulus of elasticity such that the entire sheet may be stretched for a distance corresponding to the width of at least three color sections without exceeding the elastic limit.

Referring now to both Figures 1 and 2, there is shown at the bottom edge of the mask 3 a pair of driving cam surfaces 8 and 9 which are secured to the mask and are driven by the shaft 15. The rotating cams 8 and 9 are driven by motor 17 which may be operated in synchronism with the scanning pattern of the kinescope by means of the synchronizing circuit 14. A similar pair of synchronously driven cams 20 and 21, mounted upon the shaft 19, are also secured to the mask at the top edge and are driven by the motor 17. A linkage mechanism indicated by the dotted line 22, mechanically couples the two sets of cams for simultaneous operation. Guides 23 are provided to confine motion of the mask to a single plane, thus causing flexing of the mask to relatively change the positions of the transparent sections T with respect to the color elements of the filter 5.

It will be noted that the orientation of cams 8 and 9 is different from the orientation of cams 20 and 21. Rotation of cams 8, 9, 20 and 21, therefore, will simultaneously move and stretch the flexible mask 3 in a complex oscillatory motion so that the transparent sections T of the mask 3 align themselves with different color elements of the filter 5 during the apparent continuous motion of the mask 3 across the face of the filter 5.

Some of the transparent sections will overlap a portion of two adjacent color elements of filter 5 at some positions along the mask. This is not objectionable, however, since the phosphor used upon the kinescope screen has a fast enough decay time that no image will appear after the transparent section is moved out of registration with the single color being currently scanned. The transparent section corresponding in position to the vertical scanning position of the kinescope beam will therefore at all times transmit only phosphorescent light of a single color corresponding to the desired color of the component image portion being scanned.

The relative position of the cams, and accordingly the position of the mask 3 with respect to the color filter 5, throughout the complete scanning cycle may best be illustrated by reference to the curves of Figure 4. These may be considered as empirically determined curves for indicating the relative motion of the mask and filter when in operation in accordance with one particular motion cycle for field sequential operation. The curves may be used for designing the cams, which impart the flexing or stretching motion to the mask. However, other curves may be used to indicate different motion cycles, without departing from the scope of the invention.

In the present arrangement, the motion imparted to the mask is illustrated graphically by plotting a solid line curve showing the relative position of the center of a transparent section at the bottom end of the mask with respect to the associated filter elements and a dotted line curve showing the relative position of the center of a transparent section at the top end of the transparent section of the mask with respect to the associated filter elements. Thus, both the translatory and flexing components of motion are shown by relative positions of the transparent sections at each end of the mask with respect to the filter color segments during the entire cycle.

For clarity in presentation the dotted-line curve is arbitrarily advanced on the abscissa or time scale by ten divisions, whereby the part of the dotted curve from $t_1$ to $t_2$ corresponds in time to the part of the solid-line curve from $T_1$ to $T_2$. The lines along the abscissa labeled blue level, red level and green level indicate the position of the center of all the filter elements of each color with respect to the different portions of the mask. Thus, when the solid line curve is at the "red level" it indicates that the transparent sections at the bottom region of the mask register with the filter element which passes red light.

The solid straight lines A—*a*, B—*b*, C—*c*, etc., connecting the two curves, indicate the progressive relative positions assumed by all the transparent sections along the stretched or flexed mask. The straight lines proceed alphabetically at equally spaced time intervals throughout a complete scanning cycle or frame, which occurs between time $T_1$ and $T_2$ (or between $t_1$ and $t_2$), and which includes the sequential scanning of each component color or field. Thus, when the mask is in the single position indicated by line E—*e*, for example, the bottom of the filter passes blue, the middle section passes red and the top portion passes green.

Figure 4:
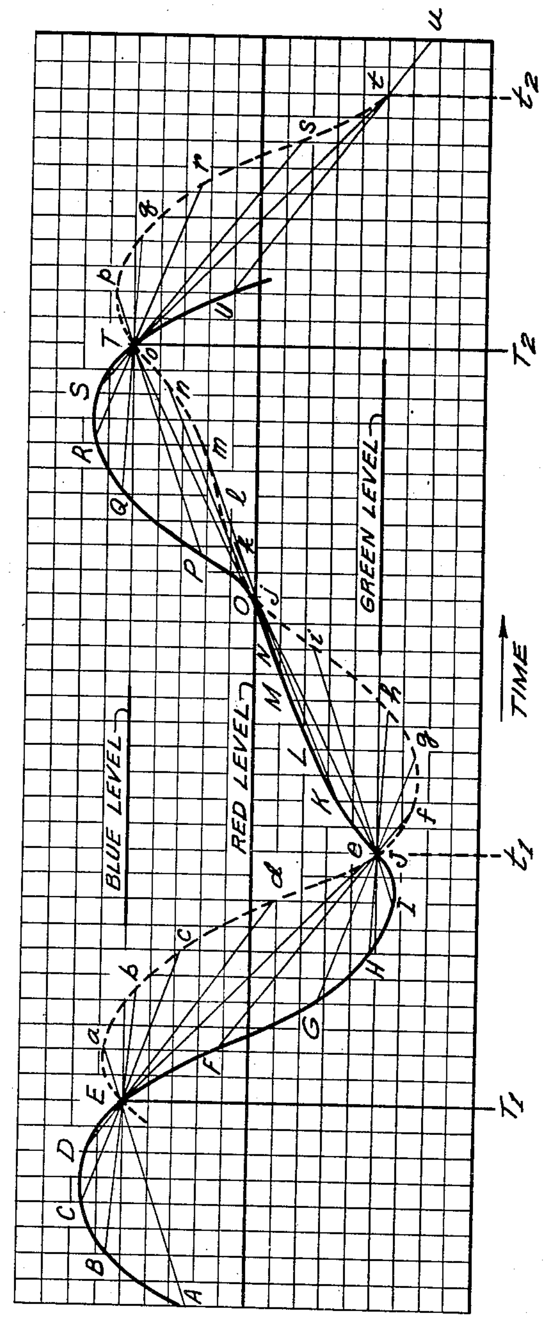

Practice of this invention is not limited to the particular preferred relative motion for field sequential operation as shown by the curves of Figure 4. It is readily recognized that flexing of the mask or of the filter in accordance with other types of motion may be employed without departing from the scope of the invention.

Briefly following the flexing motion of the mask throughout one color cycle in accordance with the preferred and illustrated mode of operation, it is seen that at position A—*a*, the transparent portion of the mask at which the blue filter section is exposed is near the top end *a* of the mask. As the mask progressively moves to positions B—*b*, C—*c*, etc., the blue filter section which is exposed by the mask moves further toward the bottom of the mask B, C, etc. The apparent continuous motion of the transparent section of the mask along the entire length of the filter, caused by the stretching motion, will in this manner cause bands of each color to be progressively transmitted by the filter and positioned along the filter in synchronism with the vertically deflected scanning beam in the cathode ray tube.

At position E—*e* the scanning cycle for green starts and proceeds in the same manner from top to bottom. Between the scanning cycles for the blue and green portions, the scanning cycle for the interspersed red filter is skipped. To reach the scanning position for green, therefore, the motion caused by flexing of the mask causes the transparent sections to proceed over the span of two color lines from the initial scanning of the blue image.

Because the transparent mask section moves over a filter element of one color (red) at this portion of the scanning cycle any remaining phosphorescence of the preceding color would dilute a portion of the red image, a phosphor should be used which will have a fast decay for the preceding color (blue). Normally, a white phosphor for color operation comprises a group of phosphor layers which provide an overall white phosphorescence rich in the red, green and blue primary colors. Thus, a fast decay phosphor layer for the color blue may be selected to cause removal of the image from the phosphor before the transparent mask section has moved from the blue position to the red position, for the type of filter motion described herein. Preferably the blue phosphor should have the faster decay time since less noticeable flicker will be introduced into the composite image than by a faster decay in the green phosphor, to which the eye is more responsive. Thus, a good compromise may be reached in the preferred blue, red, green sequence to give the best operating results between a higher intensity, slow decay phosphor and noticeable image flicker or color distortion.

At position J—*j* the scanning cycle for red starts, and at the finish of this cycle the entire color scanning process repeats itself by starting again with blue at the top of the mask in position O—*o*. Thus, the mask is irregularly stretched in an oscillatory motion such that, in one cycle of the oscillatory motion, a single transparent section apparently traverses in succession the entire length of the color filter. During the traversal apparently the traveling transparent section only moves across color elements of a single component color. In this manner a band of color is transmitted by the filter and progresses along the filter in synchronism with the kinescope vertical scanning pattern for the corresponding color field.

The cyclic flexing motion of the mask and corresponding movement of the transparent sections therefore has substantially the same effect as a traveling transparent section smoothly traversing the entire length of the color filter. This is accomplished because, during substantially the entire color cycle, the transparent section near one end of the mask transmits a different color than the transparent section near the other end of the mask, as indicated by the straight lines A—*a*, B—*b*, etc. of the graph. Each color transmission band then moves down the screen in synchronism with the vertically deflected scanning ray to provide improved field sequential operation without continuous rotary motion of the filter.

The cams 20 and 21 at the top of the mask cause one color to be transmitted to the initial transparent element at the top of the mask as indicated by points *a*, *b*, etc. on the dotted line. Cams 8 and 9 likewise cause a different color to be transmitted by the last transparent element at the bottom of the mask as indicated by the points A, B, etc. for essentially the entire motion cycle. As the relative positions of the cam protuberances at the top and bottom change, the tension of the mask varies and the entire mask stretches in accordance with Hooke's law to give linear progression in the scanning of each color by the bands of transparent mask sections. Therefore, intermediate portions upon the lines A—*a*, etc., which represent intermediate mask sections, transmit colors which are representative of colors on the graph located at the intermediate points along the lines. The mask is adjusted so that it is always under a slight degree of tension, even at the position E—e when the tension is least.

The tension is greatest in positions J—j and O—o. Thus, the net change in stretch upon the mask if going from E—e to J—j is in the order of three color filter element widths. The elements are initially spaced close enough together to resolve a single color into a complete image when viewed from the distance of a few feet. Since this distance is very small compared to the overall mask length, there is little danger of exceeding the elastic limit of the mask at the maximum tension position, and therefore the choice of materials from which mask may be made is large.

In the present system the lines or color filter elements are placed substantially parallel to the horizontal scanning pattern of the cathode ray tube. Thus the entire scanning line transmits the same color at all times, and the motion may be smoothly imparted without any additional momentum caused by rotational motion. The motive force required is far less than that necessary to move an entire mask over the distance of one or two lines during the relatively short vertical flyback or blanking period of the standard television signals. Not only does this provide for less complicated and more efficient motion mechanisms, but the noise of operation is considerably reduced thereby.

It is possible to compress rather than stretch the mask or otherwise distort it to give proper color information. Also, the relative motion of the mask and color filter may result from either motion of the mask or of the filter. Therefore the invention comprises a color filter for a television system having images presented in accordance with a predetermined scanning pattern. The filter provides color intelligence to the system by means of a plurality of relatively movable color filter members, one of which is synchronously distorted to cause the color intelligence to follow the scanning pattern of the image. A system is thus provided for exposing a plurality of pattern combinations by simultaneously moving and flexing at least one of a plurality of pattern presenting members to provide relative motion between the members and so present the desired pattern combination.

Having thus described the invention and its mode of operation, certain features of the invention which are believed illustrative thereof are defined with particularity in the appended claims.

What is claimed is:

1. A light filter for use in color television systems comprising in combination, a plurality of different selected component color strip-like elements of the same dimensions and arranged sequentially side by side in repeating groups, a flexible mask positioned in a plane adjacent to and parallel with the plane of said elements, said mask having alternate transparent and opaque sections, the transparent sections of which substantially correspond in size, shape and spacing with the size, shape and spacing of one of the said color elements, and means to irregularly stretch said mask to expose said elements with respect to the transparent sections of said mask in an oscillatory motion such that in one cycle of said oscillatory motion the plurality of adjacent elements of each selected component color is traversed in succession along the entire length of the filter by succeeding transparent sections along the entire length of the mask, and wherein the traverse by said transparent portions with respect to said elements near one end of said mask is of a different color than at the other end of said mask during substantially the entire cycle.

2. In a television system of the type adapted to reproduce images in substantially their natural color by a process of progressive scanning of an electron beam upon the fluorescent screen of a cathode ray tube, means for presenting different component color image portions in sequence comprising, a plurality of different selected component color strip-like elements of the same dimensions and arranged sequentially side by side and in repeating groups, a flexible mask positioned in a plane adjacent to and parallel with the plane of said elements, said mask having alternate opaque and transparent sections, the transparent sections of which substantially correspond in size, shape and spacing with the size, shape and spacing of one of said color elements, and means to irregularly stretch said mask to expose said color elements with respect to the transparent sections such that the full width of each transparent section of the mask exposes in succession each adjacent color element of the color sequence pattern thereby traversing substantially the full length of the filter in synchronism with the corresponding traversal of the electron beam upon the fluorescent screen of the cathode ray tube.

3. In a television system of the type adapted to reproduce images in substantially their natural color by a process of sequentially scanning over a plurality of color fields, means for presenting different component color image representations in sequence comprising, a filter comprising a plurality of different selected component color strip-like elements of the same dimensions arranged sequentially side by side and in repeating groups, a flexible mask positioned in a plane adjacent to and parallel with the plane of said elements, said mask having transparent sections which substantially correspond in size, shape and spacing to one of said color elements, means to distort said mask to cause relative motion between said mask and said filter and apparent traversal of said transparent sections causing a band of color to progress from top of the filter to the bottom in synchronism with the scanning pattern of the designated component color.

4. A system for progressively scanning portions of a multi-color image in sequential color steps comprising in combination, means for presenting different scanned component color image portions in sequence, a color filter member for said image portions comprising a plurality of color elements arranged sequentially in repeating groups, a mask filter member having alternate transparent and opaque sections the transparent sections of which substantially correspond in size, shape and spacing with the size, shape and spacing of the color elements, one of said members being flexible, and means for distorting the flexible one of said members in accordance with a predetermined oscillatory motion to cause relative motion between the members and to transmit light of only a given color by registering the color elements with the transparent sections in a predetermined sequence corresponding to the color image scanning pattern presented by said first mentioned means.

5. A device as defined in claim 4 wherein the means presenting the image portions is a cathode ray tube, and the color portions are essentially lines positioned parallel to the horizontal scanning pattern of said tube.

6. A device as defined in claim 5 wherein the color lines are of such width that they resolve into a complete image when viewed from the distance of a few feet.

7. A device as defined in claim 4 wherein field sequential color scanning means is utilized, and adjacent elements of the same color are spaced so as to resolve into a complete image when viewed from the distance of a few feet.

8. A system as defined in claim 4 wherein the means presenting the image portions is a cathode ray tube, the tube has a phosphor corresponding to one color which has a relatively fast decay time, and the color sequence is chosen to provide less noticeable flicker in the composite image.

9. A light filter for use in a color television system comprising in combination, a color filter member comprising a plurality of different selected component color strip-like elements of the same dimensions and arranged sequentially side by side in repeating groups, a mask filter member positioned in a plane adjacent and parallel with the plane of said first mentioned filter member, and one of said members being flexible, means to irregularly stretch and move the flexible one of said filter members in a pattern causing said color strip elements to be exposed in synchronism with the corresponding color intelligence of said system.

10. A filter as defined in claim 9 wherein the means to irregularly stretch and move the one filter member provides an oscillatory motion such that the adjacent color elements of each selected component color is traversed in succession along the entire length of the color filter member by succeeding mask sections along the entire length of the mask filter member, and wherein color elements at both ends of the color filter member are exposed by said mask filter member and the color elements at one end of the color filter member are of a different color than at the other end during substantially the entire cycle of oscillatory motion.

ALDA V. BEDFORD.

References Cited in the file of this patent

UNITED STATES PATENTS

| Number | Name | Date |
|---|---|---|
| 2,386,074 | Sziklai | Oct. 2, 1945 |
| 2,415,226 | Sziklai | Feb. 4, 1947 |
| 2,457,415 | Sziklai | Dec. 28, 1948 |

FOREIGN PATENTS

| Number | Country | Date |
|---|---|---|
| 589,345 | Great Britain | June 18, 1947 |
| 620,137 | Great Britain | Mar. 21, 1949 |
| 838,389 | France | Mar. 3, 1939 |